(12) United States Patent  
Miller et al.

(10) Patent No.: US 9,199,675 B2
(45) Date of Patent: Dec. 1, 2015

(54) CORNER COUPLED VORTEX STRUCTURES, TRAILERS, AND VEHICLES INCLUDING THE SAME

(71) Applicants: Megan Elizabeth Miller, Elon, NC (US); Mark Frederic Miller, Elon, NC (US)

(72) Inventors: Megan Elizabeth Miller, Elon, NC (US); Mark Frederic Miller, Elon, NC (US)

(*) Notice: Subject to any disclaimer, the term of this patent is extended or adjusted under 35 U.S.C. 154(b) by 0 days.

(21) Appl. No.: 14/560,760

(22) Filed: Dec. 4, 2014

(65) Prior Publication Data

US 2015/0166128 A1    Jun. 18, 2015

Related U.S. Application Data

(60) Provisional application No. 61/963,747, filed on Dec. 12, 2013.

(51) Int. Cl.
*B62D 35/00* (2006.01)

(52) U.S. Cl.
CPC .............. *B62D 35/007* (2013.01); *B62D 35/00* (2013.01); *B62D 35/001* (2013.01)

(58) Field of Classification Search
CPC .... B62D 35/00; B62D 35/001; B62D 35/004; B62D 35/007; B62D 35/008; B62D 37/02
USPC .................. 296/180.1, 180.2, 180.4; 180/903
See application file for complete search history.

(56) References Cited

U.S. PATENT DOCUMENTS

| | | | |
|---|---|---|---|
| 3,724,892 A | 4/1973 | Ridder | |
| 4,113,299 A * | 9/1978 | Johnson et al. | 296/180.4 |
| 4,458,936 A | 7/1984 | Mulholland | |
| 4,978,162 A * | 12/1990 | Labbe | 296/180.2 |
| 5,108,145 A | 4/1992 | Harris | |
| 5,190,342 A | 3/1993 | Marlowe et al. | |
| 5,348,366 A | 9/1994 | Baker et al. | |
| 6,409,252 B1 | 6/2002 | Andrus | |
| 6,595,578 B1 | 7/2003 | Calsoyds et al. | |
| 6,959,958 B2 | 11/2005 | Basford | |
| 7,431,381 B2 | 10/2008 | Wood | |
| 7,748,771 B2 | 7/2010 | Distel et al. | |
| 8,091,951 B1 * | 1/2012 | Fitzgerald | 296/180.4 |
| 8,641,126 B2 | 2/2014 | Visser et al. | |

(Continued)

FOREIGN PATENT DOCUMENTS

CA    2789819        3/2013
FR    2878489 A1 *  6/2006

(Continued)

OTHER PUBLICATIONS

AirTabs (2011) Aerodynamics of Trucks, *Aerodynamic Fuel Economy Savers for Road Vehicles*, Retrieved from internet on Dec. 23, 2014 at URL http://www.airtab.com/how-do-they-work.htm.

(Continued)

*Primary Examiner* — Jason S Daniels
(74) *Attorney, Agent, or Firm* — Myers Bigel Sibley & Sajovec, P.A.

(57) ABSTRACT

An apparatus can include a vortex structure that can be configured to couple at a corner where a longitudinal side of a bluff body transitions toward a back side of the bluff body structure. A curved surface of the vortex structure can be configured to protrude beyond the longitudinal side of the bluff body structure when the vortex structure is coupled at the corner. Related trailers and vehicles are also disclosed.

24 Claims, 7 Drawing Sheets

(56) References Cited

U.S. PATENT DOCUMENTS

| | | | |
|---|---|---|---|
| 8,820,817 | B1 | 9/2014 | Anderson |
| 2007/0046067 | A1* | 3/2007 | Verona .................. 296/181.6 |
| 2009/0026797 | A1 | 1/2009 | Wood |
| 2009/0295189 | A1* | 12/2009 | Distel et al. .............. 296/180.1 |
| 2010/0194142 | A1* | 8/2010 | Seifert et al. ............. 296/180.1 |
| 2011/0095566 | A1* | 4/2011 | Chen ........................ 296/180.4 |
| 2012/0126572 | A1* | 5/2012 | Hjelm et al. .............. 296/180.1 |
| 2013/0076068 | A1* | 3/2013 | Wayburn et al. ......... 296/180.4 |
| 2013/0088040 | A1* | 4/2013 | Pfaff ......................... 296/180.4 |
| 2013/0285411 | A1 | 10/2013 | Layfield et al. |
| 2014/0117713 | A1 | 5/2014 | Baker |

FOREIGN PATENT DOCUMENTS

| | | |
|---|---|---|
| GB | 2481640 | 1/2012 |
| RU | 2270125 | 2/2006 |
| WO | WO 2013/063479 A1 | 5/2013 |

OTHER PUBLICATIONS

Benson T. "Drag of a Sphere", *NASA*, Updated Jun. 12, 2014, 4 Pages, Retrieved from URL https://www.qoogle.com/#q=nasa+drag+of+sphere.

Bhatnagar et al. "A Study of Reynolds Number Effects on Production Class 8 Tractor-Trailer Combinations", *CFD Engineering Analysis*, Chicago, Jun. 28, 2011.

Billing J. (2010) "The Effect of Wind on Heavy Vehicles", *Proc. HVTT10*, Retrieved from URL http://road-transport-technology.org/HVTT10/Proceeding/Papers/Papers_HVTT/paper_74.pdf.

Browand F. "Reducing Aerodynamic Drag and Fuel Consumption", *Global Climate and Energy Project—Workshop on Advanced Transportation*, Oct. 10-11, 2005, Lecture Conducted from USC Viterbi School of Engineering, Stanford.

Browand, F., McCallen, R. & Ross, J. (2009). *The Aerodynamics of Heavy Vehicles II: Trucks, Buses, and Trains*. Berlin: Springer.

Cairns, R. (1994). Lateral aerodynamic characteristics of motor vehicles in transient crosswinds. *The Dissertation of Robert Cairns, PhD Thesis*. Retrieved from https://dspace.lib.cranfield.ac.uk/handle/1826/2507.

Cummings (2012) "Secrets of Better Fuel Economy", *Cummins MPG Guide*, Retrieved from URL https://cumminsengines.com/uploads/docs/cummins_secrets_of_better_fuel_economy.pdf.

Diesel Miser (2013) Popular fuel savings mods. *Diesel Miser Products*, Retrieved from URL http://www.dieselmisers.com/Products.htm.

DOE (2011) Heavy vehicles and characteristics, *Transportation energy data book*, Edition 33 (pp. 74-102) Knoxville: Springer.

EIA (2011) Diesel Fuel, *EIA Energy Kids*, 4 Pages, Retrieved from URL http://www.eia.gov/Kids/energy.cfm?page=diesel_home.

EPA (2012) Verified aerodynamic technologies, *SmartWay Technology Program*, Retrieved from URL http://www.epa.gov/smartway/.

Goodyear (2008), Factors Affecting Truck Fuel Economy, *Goodyear Commercial Tire Systems*, Retrieved from URL http://www.goodyear.com/truck/pdf/commercialtiresystems/FuelEcon.pdf.

Gustavsson T. (2006) "Alternative approaches to rear end drag reduction", *KTH Engineering Sciences*, Stockholm, 1-49.

Lemke L. (2010) "Aerodynamics of Spheres", *NARCAP Executive Advisory Committee*, Retrieved from URL http://narcap.org/Projsphere/narcap_ProjSph_2.1_aerody.pdf.

Miller M. "Fuel Efficient Passive Flow Control for Class 8 Tractor Trailers", *Western Alamance High School*, Jan. 12, 2014.

Ogburn et al. "Transformational Trucks: Determining the Energy Efficiency Limits of a Class-8 Tractor-Trailer", *Rocky Mountain Institute*, Jul. 2008.

Polezhaev Y. et al. "Drag Coefficient", *A-to-Z Guide to Thermodynamics, Heat & Mass Transfer, and Fluids Engineering*, 2 Pages, Feb. 2011.

Salari K. "DOE's Effort to Reduce Truck Aerodynamic Drag through Joint Experiments and Computations", *DOE Annual Merit Review*, Project ID #VSS006, Jun. 7-11, 2010, Lawrence Livermore National Laboratory.

Salari K. et al. "Tractor-trailer truck aerodynamics", 2010, *Access Science—Inspiring Science Discovery*, 5 Pages, Retrieved from URL http://accessscience.com/content/Tractor-trailer%20truck%20aerodynamics/YB100085.

Tan et al. "Effects of cross wind on sport utility vehicles (SUV): A computational study", *The Fifth International Symposium on Computational Wind Engineering*, May 23-27, 2010, 8 Pages.

Wood et al. (2006) "Simple and Low-Cost Aerodynamic Drag Reduction Devices for Tractor-Trailer Trucks", Retrieved from URL http://www.solusinc.com/pdf/2003-01-3377.pdf Copyright 2003 SAE International.

Gad-el Hak, M. (2000), Flow Control—Passive, Active, and Reactive Flow Management, Cambridge, New York, Cambridge University Press, pp. 189-222.

International Search Report; PCT/US2014/069749; Dec. 11, 2014; (6 pages).

Smith et al; *Aerodynamic Impact of Tractor-Trailer in Drafting Configuration*, SAE International, 2014-01-2436; Sep. 30, 2014; pp. 619-625.

\* cited by examiner

CORNER COUPLED VORTEX STRUCTURES, TRAILERS, AND VEHICLES INCLUDING THE SAME

CROSS-REFERENCE TO RELATED APPLICATION

This application claims priority to U.S. Provisional Patent Application No. 61/963,747, entitled Rear Coupled Vortex generator Device for Cargo Bodies, filed Dec. 12, 2013, the entire disclosure of which is hereby incorporated herein by reference.

FIELD

The invention relates to the field of aerodynamics in general, and more particularly, to aerodynamic drag.

BACKGROUND

Some storage containers of a trailer, sometimes referred to as a "bluff body," terminate with a large flat back surface. This shape can cause an area of reduced pressure to be created behind the storage container as it moves, thus generating a force that can be overcome with additional engine power and thus, additional fuel. In other words, air flow passing behind the vehicle can impart an aerodynamic drag force on the vehicle.

It is known to deploy a structure at the back of the storage container to address the drag force. For example, back trailer fairings can be used to streamline the back end of the trailer in order to control the air flow. Such a reduction on the drag of the vehicle may conserve fossil fuels as well as other sources of vehicle drive power for hybrid vehicles, battery-operated vehicles, and alternative fuel-based vehicles, for example.

The reduction of aerodynamic drag forces is also discussed in, for example, U.S. Pat. No. 4,458,936 entitled Drag Reducing Fairing For Trucks, Trailers And Cargo Containers by Mulholland; U.S. Pat. No. 5,108,145 entitled Apparatus And Method For Motor Vehicle Air Drag Reduction Using Rear Surface Structure by Harris; U.S. Pat. No. 5,190,342 entitled Tractor-Trailer Aerodynamic Drag Reduction by Marlowe et al.; U.S. Pat. No. 5,348,366 entitled Drag reducing device for land vehicles by Baker et al.; U.S. Pat. No. 6,409,252 entitled Truck Trailer Drag Reducer by Andrus; U.S. Pat. No. 6,595,578 entitled Truck After-Body Drag Reduction Device by Calsoyds et al; U.S. Pat. No. 6,959,958 entitled Aerodynamic Combination For Improved Base Drag Reduction by Basford; U.S. Pat. No. 8,641,126 entitled Sealed Aft Cavity Drag Reducer by Visser et al.; U.S. Pat. No. 8,820,817 entitled Tractor Trailer Rear Door Air Drag Reduction System To Reduce Fuel Consumption, by Anderson; U.S. Patent Publication No. 2013/0285411 entitled Drag Reduction Plate and Structure For Trailers by Layfield et al.; and U.S. Patent Publication No. 2014/0117713 entitled Aerodynamic Rear Drag Reduction System For A Trailer by Baker, the entire disclosures of all of which are incorporated herein by reference.

SUMMARY

Embodiments according to the invention can provide corner coupled vortex structures. Pursuant to these embodiments, an apparatus can include a vortex structure that can be configured to couple at a corner where a longitudinal side of a bluff body transitions toward a back side of the bluff body structure. A curved surface of the vortex structure can be configured to protrude beyond the longitudinal side of the bluff body structure when the vortex structure is coupled at the corner.

In some embodiments, a vehicle can include a longitudinal side oriented parallel to air flow over the vehicle when moving in a forward direction and a back side oriented facing opposite the forward direction and include a corner where the longitudinal side transitions toward the back side. A vortex structure can be integrated with the vehicle at the corner, where the vortex structure can include a curved surface that protrudes beyond the longitudinal side. In some embodiments, the cylindrical surface protrudes beyond the longitudinal side to present about 32 cm2 to about 67 cm2 of surface area into the air flow. In some embodiments, the vehicle comprises a passenger automobile.

DETAILED DESCRIPTION OF EMBODIMENTS ACCORDING TO THE INVENTION

Figure 1:
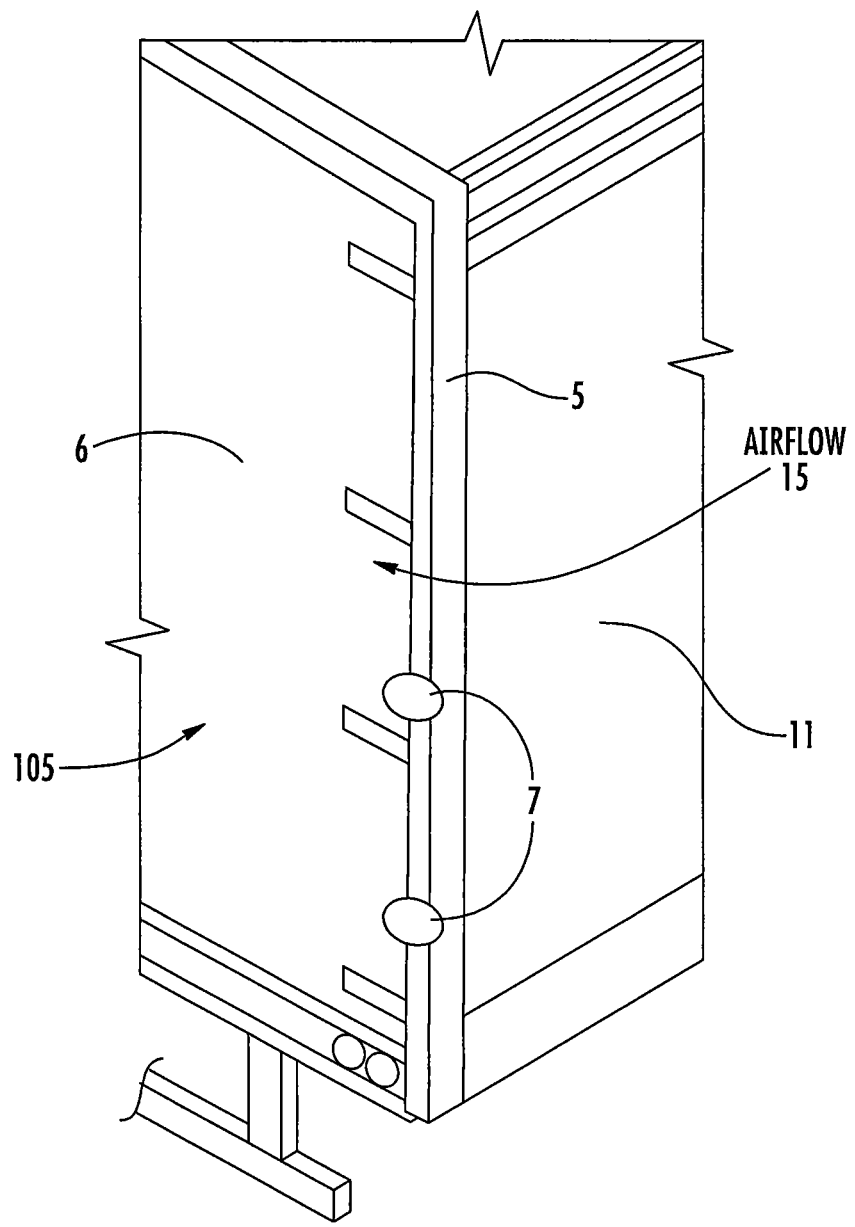
FIG. 1 is a view of a back corner of a trailer having a plurality of vortex structures coupled at the corner in some embodiments according to the invention.

The invention now will be described more fully hereinafter with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "front", "back", "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "a front surface" would then be oriented as a "back surface". Thus, the exemplary term "front" can encompass both an orientation of "front" and "back". The device may be otherwise oriented (rotated 90 degrees or at other orientations) and the spatially relative descriptors used herein interpreted accordingly.

As described herein in greater detail, in some embodiments according to the invention, a vortex structure can be configured to couple at a corner of a bluff body structure where a longitudinal side of the bluff body transitions toward a back side of the bluff body. The vortex structure can include a curved surface that is configured to protrude beyond the longitudinal side of the bluff body structure into an air flow over the side. For example, when the vortex structure is coupled at the corner, a particular portion of the surface area of the vortex structure can protrude beyond the longitudinal sidewall into an air flow that passes along the longitudinal side. The curved surface is configured to convey the air flow around the corner toward a space that is adjacent to the back side of the bluff body structure. In other words, the curved surface of the vortex structure is curved such that some air flow passing by the longitudinal side is conveyed around the corner to behind the back side thereby reducing aerodynamic drag on the bluff body.

It will be understood that, in some embodiments, the vortex structure can protrude beyond the longitudinal side into the air flow by an amount which is selected to introduce a particular surface area of the vortex structure into the air flow to generate an aerodynamic drag, which can be overcome by the conveyance of the air flow around the corner toward the back side of the bluff body structure. Accordingly, while a certain amount of aerodynamic drag can be introduced by the protrusion of the vortex structure into the air flow, the net effect of the vortex structure is to actually reduce the drag on the bluff body by conveying the air flow around the corner to reduce the vacuum behind the back side by an amount which exceeds the additional drag introduced by the protrusion of the vortex structure into the air flow.

It will be also understood that, although many of the embodiments described herein relate to the addition of vortex structures to trailers, the vortex structures in some embodiments according to the invention can be used in many other applications, such as any vehicle that generates a vacuum or partial vacuum behind the back side when the vehicle moves forward.

It will be also understood that although the vortex structures described herein are described as being configured to be releasably coupled to trailers and vehicles, in some embodiments according to the invention, the vortex structures can be incorporated into the structures of the vehicles and trailers themselves such as by being included into a panel of a vehicle in the design and manufacturing of the vehicle. Accordingly, the vortex structures may be incorporated into other elements, such as tail lights, spoilers, and other structures presently found on vehicles.

It will be understood that the term "curved surface" is utilized herein to encompass structures which are curved sufficiently to produce the effect described herein. In other words, a vortex structure in some embodiments according to the invention, can include only a portion of the surface that is curved whereas other portions of the surface may not be curved, while overall being configured to convey sufficient air flow from alongside the longitudinal side to around the corner toward the back side of the bluff body structure. In other words, in some embodiments according to the invention, not all portions of the curved surface of the vortex structure over which air flow is conveyed need be curved. To the contrary, a portion of the vortex structure which is curved need only be that portion of the vortex structure which is needed to convey the air flow from the longitudinal side toward the back side as described herein.

FIG. 1 is a view of a back corner 5 of a trailer 100 having a plurality of vortex structures 7 coupled at the corner 5 where a longitudinal slide 11 transitions toward a back side 105 of the trailer 100 in some embodiments according to the invention. According to FIG. 1, air flow 15 is conveyed alongside the longitudinal side 11 when the trailer 100 is pulled in a forward direction 110. The vortex structures 7 are configured for coupling at the corner 5 where the longitudinal side 11 transitions toward the back side 105. When the trailer 100 moves in the forward direction 110 the air flow 15 is conveyed past the longitudinal side 11 and meets respective curved surfaces of the vortex structures 7 and is conveyed along the curved surfaces around the corner 5 into a space behind the back side 105. It will be understood that the vortex structures 7 each protrude into the air flow 15 to present a surface area to the air flow 15 that can generate a corresponding aerodynamic drag element. This increase in aerodynamic drag generated by the surface area presented by the protruding portion of the vortex structures 7 into the air flow 15 is overcome, however, by the reduction in drag generated by the conveyance of the air flow 15 into the space behind the back side 105.

It will be understood that, as used herein, the term "corner" can refer to a single element of the bluff body or to an assembly of elements. For example, although the corner may be referred to as a single structure, the corner may actually be provided by an assembly of parts such as pieces of a frame that are used to construct the trailer and pieces that are used to join the pieces of the frame together as well as pieces of the longitudinal side 11 and the back side 105 which are connected to the frame at the corner 5. Accordingly, the corner 5 can also be referred to herein as the location on the bluff body where the longitudinal side 11 transitions toward the back side 105.

It will be understood that although two vortex structures 7 are shown in FIG. 1, additional vortex structures 7 can also be coupled at the corner 5 and, moreover, can be coupled on the opposing corner on the other side of the back side 105 of the trailer 100. In other words, only a single corner 5 of the back side 105 is shown in FIG. 1 although additional vortex structures 7 can be coupled at the opposing corner not shown. It will be further understood that the reduction in drag provided by the vortex structures 7 can be accumulated by the coupling of additional vortex structures 7 at the corner 5. In other words, the plurality of vortex structures 7 may protrude into the air flow 15 more or less depending on the number of vortex structures 7 to be coupled at the corner 5. For example, a total surface area may be presented into the air flow 15 by the two vortex structures 7 shown in FIG. 1, whereas if an additional vortex structure 7 were to be coupled at the corner 5, the total surface area presented by the three vortex structures 7 may remain constant by reducing the protrusion of each of the vortex structures into the air flow 15.

Figure 2:
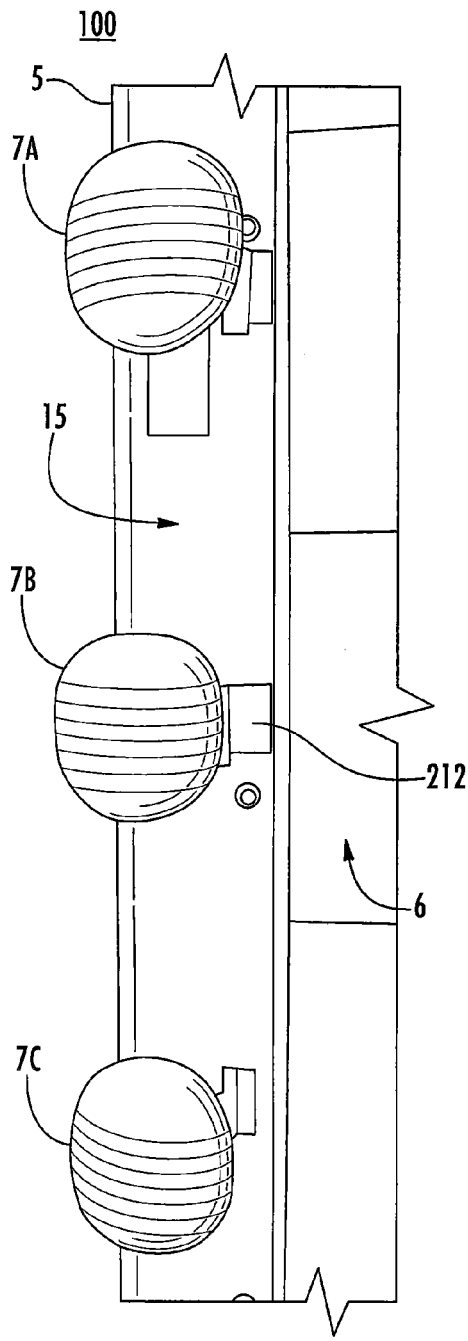
FIG. 2 is a view of the trailer in FIG. 1 having a plurality of vortex structures coupled at the opposing corner, which partially protrude past a longitudinal side of the trailer into air flow over the longitudinal side in some embodiments according to the invention.

FIG. 2 is a view of the opposing longitudinal side 11 and opposing corner 5 of the trailer 100 shown in FIG. 1. As shown in FIG. 2, three vortex structures 7A-7C are shown coupled at the corner 5. Moreover, the view in FIG. 2 illustrates an on-edge perspective whereby the air flow 15 is conveyed directly along the opposing longitudinal side 11 when the trailer 100 is pulled in the forward direction 110. As further shown in FIG. 2, each of the vortex structures 7A-7C protrudes past the opposing longitudinal side 11 into the air flow 15 to present a surface area for each of the respective vortex structures 7A-7C over which the air flow 15 is conveyed around the opposing corner 5 to behind the back side 105 of the trailer 100. It will be further understood that although the vortex structures 7A-7C are shown as protruding beyond the opposing longitudinal side 11 into the air flow 15 by approximately the same amount, each of the vortex structures 7A-7C may protrude by different amount into the air flow 15.

It will be understood that that the vortex structures may be configured for coupling at the opposing corner 5 by any coupling device 212 that provides sufficient mechanical coupling to withstand the conditions in which the vortex structures 7 are to be used. For example, in some embodiments according to the invention, the vortex structures 7 can be releasably coupled at the opposing corner 5 by any number of the coupling devices 212 including magnets, hook and loop type straps, snaps, buckles, and any other device which enables, for example, the end user (such as a driver) to couple the vortex structures 7A-7C at the opposing corner 5 as well as to un-couple the vortex structures 7A-7C from the opposing corner 5. In other words, in some uses the vortex structures may not be desirable (such as at a low speed), whereas in other uses (such as at highway speeds) the vortex structures 7 can more readily reduce the aerodynamic drag associated with the trailer 100.

In still other embodiments according to the invention, the vortex structures 7 may be coupled together and coupled at the opposing corner 5 in unison with one another. In still other embodiments according to the invention, the vortex structures 7 may be coupled separately from one another. In still further embodiments according to the invention, the vortex structures 7 can be rigid structures made from, for example, plastics, metal, wood or any other material which provides a rigid structure over which the air flow 15 can be conveyed. In still other embodiments according to the invention, the vortex structures 7 can be deformable and made of materials such as rubber, deformable plastic, foam, or other materials which whilst conveying the air flow 15 around the opposing corner 5 to the back side 105 of the trailer 100, to allow the vortex structures 7 to be deformed, such as when a door 6 of the trailer 100 is opened to lay against the longitudinal side 11. When the door 6, however, is returned to the closed position, the deformable vortex structure 7 is configured to return to its original shape including the curved surface such that the air flow 15 is again conveyed from the longitudinal side around the opposing corner 5 to the back side 105 of the trailer 100.

In still further embodiments according to the invention, the vortex structures 7 may be inflatable such that when an operator desires, the vortex structures 7 can be inflated to provide the operation described herein. The vortex structures 7 may also be deflated by the operator. In such embodiments according to the invention, the inflation may be provided separately to each of the vortex structures 7 or together and may be done remotely from the cab of a truck even when the trailer 100 is moving.

Figure 3A:
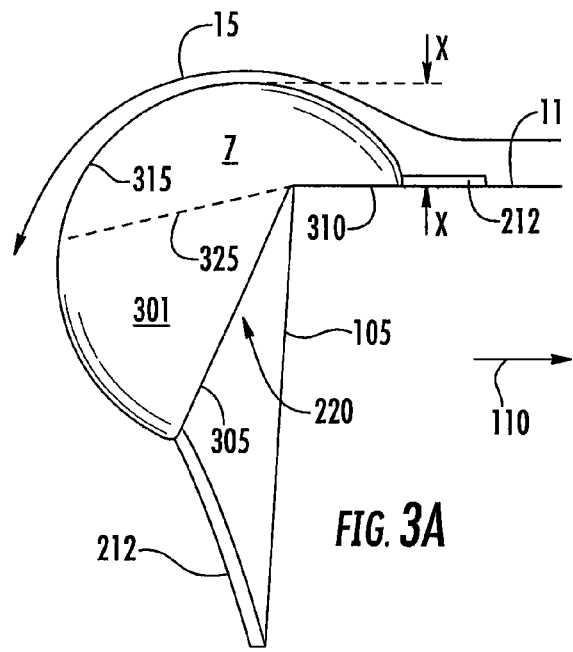
FIGS. 3A-3C are schematic illustrations of a vortex structure configured for coupling at the back corner of the trailer in some embodiments according to the invention.
Figure 3B:
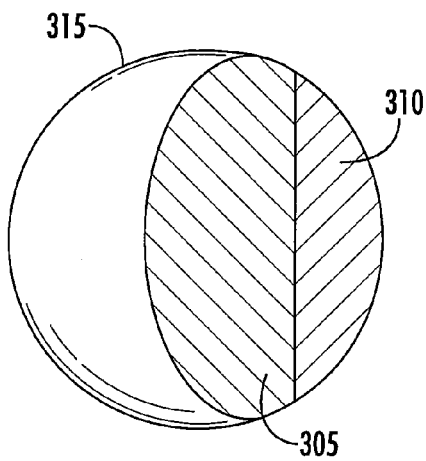
Figure 3C:
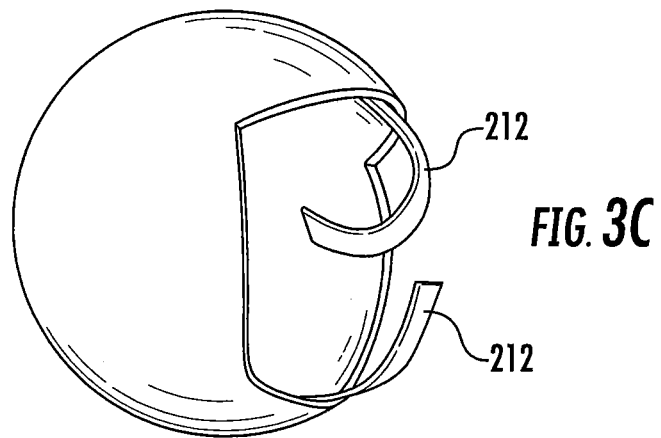

FIGS. 3A-3C are views of a vortex structure 7 in some embodiments according to the invention. According to FIG. 3A, the vortex structure 7 includes a body 301 with a curved surface 315 and boundaries 305 and 310 taken from the body 301 to form a notch 220 in the body 301. The notch 220 is configured so as to allow the vortex structure 7 to be coupled at the corner 5 of the bluff body where the longitudinal side 11 transitions towards the back side 105. It will be understood that the boundaries 305 and 310 can be formed by cutting a body that is used to form the vortex structure 7 to provide the notch 220. Accordingly, the boundaries 305 and 310 can be provided by the respective surfaces that are exposed by formation of the notch 220 if, for example, the vortex structure 7 were formed from a solid body. In still other embodiments according to the invention, if for example, the vortex structure 7 were to be formed from a hollow body, the boundaries 305 and 310 may only include the edge of the body 301 to define the notch 220.

As further shown in FIG. 3A, the curved surface 315 can curve away from the longitudinal side 11 and away from the direction of travel 110 until the curved surface 315 passes a boundary 325 which is past an imaginary line extended along the longitudinal side 11. In other words, the curved surface 315 can be curved at least until the curved surface reaches the boundary 325 which is past the longitudinal side 11 such that the air flow 15 is conveyed over the curved surface to behind the back side 105. As further shown in FIG. 3A, the curved surface 315 extends a distance X outward from the longitudinal side 11 so that a particular surface area of the curved surface 315 is presented into the air flow 15. In some embodiments according to the invention, the vortex structure 7 presents a surface area of about 32 cm$^2$ to about 67 cm$^2$ as a result of the protrusion of X into the air flow 15.

Figure 4:
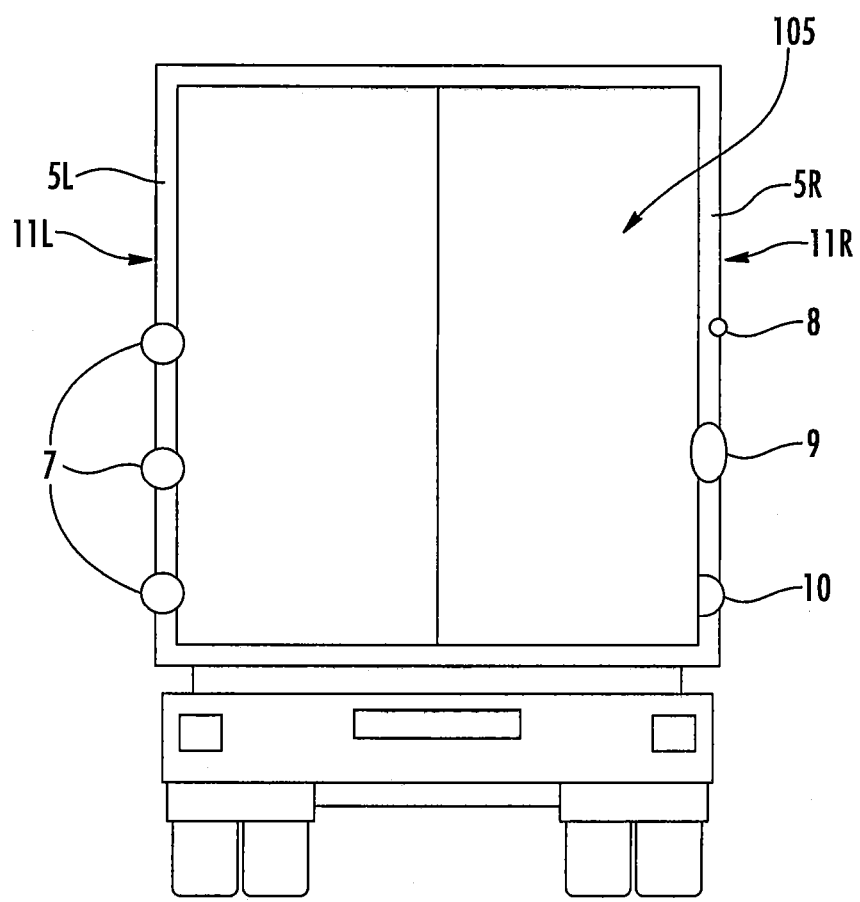
FIG. 4 is a schematic view of the trailer including a plurality of vortex structures coupled at opposing back corners of the trailer in some embodiments according to the invention.

FIG. 4 is a schematic view of the back side 105 of the trailer 100. According to FIG. 4, six vortex structures are shown, wherein three vortex structures 7 are coupled to the left corner 5L and three vortex structures 8, 9, and 10 are coupled to the right corner 5R. As further shown in FIG. 4, the plurality of vortex structures 7 shown coupled on the left corner 5L are each positioned to present the same surface area into the air flow 15 passing over the longitudinal side 11L whereas the vortex structures 8, 9, and 10 shown coupled to the corner 5R protrude by different amount past the longitudinal side 11R to present different surface areas to the respective air flow passing over longitudinal side 11R. It will be further understood that as shown in FIG. 4, the vortex structures 8, 9 and 10 can be different shapes and sizes from one another.

Figure 5:
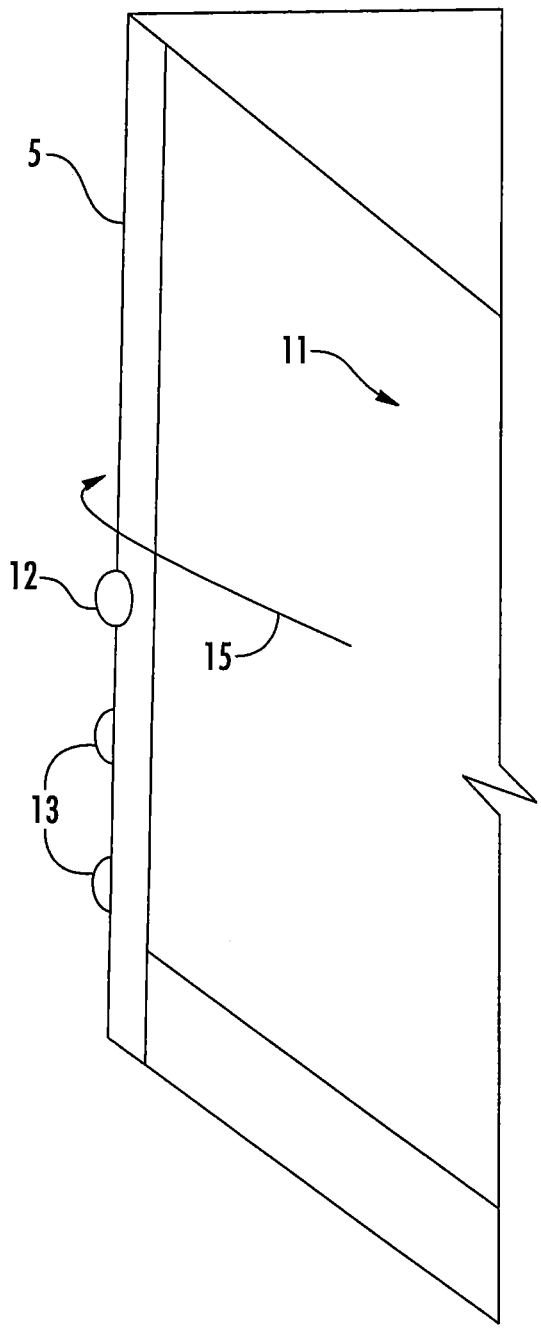
FIG. 5 is a schematic illustration of the back corner and longitudinal side of the trailer including a plurality of vortex structures coupled at the corner, each of which protrudes a different amount beyond the longitudinal side into the air flow in some embodiments according to the invention.

FIG. 5 is a view of the longitudinal side 11 of the trailer 100 including a plurality of vortex structures 12 and 13 coupled at the corner 5 in some embodiments according to the invention. According to FIG. 5, the vortex structure 12 protrudes past the longitudinal side 11 by an amount which is more than the protrusion associated with the vortex structure 13 and is less than the protrusion associated with the vortex structure 14. It will be understood, however, that that in some embodiments according to the invention, the total surface area associated with all of the vortex structures 12, 13, and 14 can be aggregated to provide a total surface area for the longitudinal side 11 to produce a net reduction in aerodynamic drag where each of the vortex structures contributes to the reduction in the drag.

Figure 6:
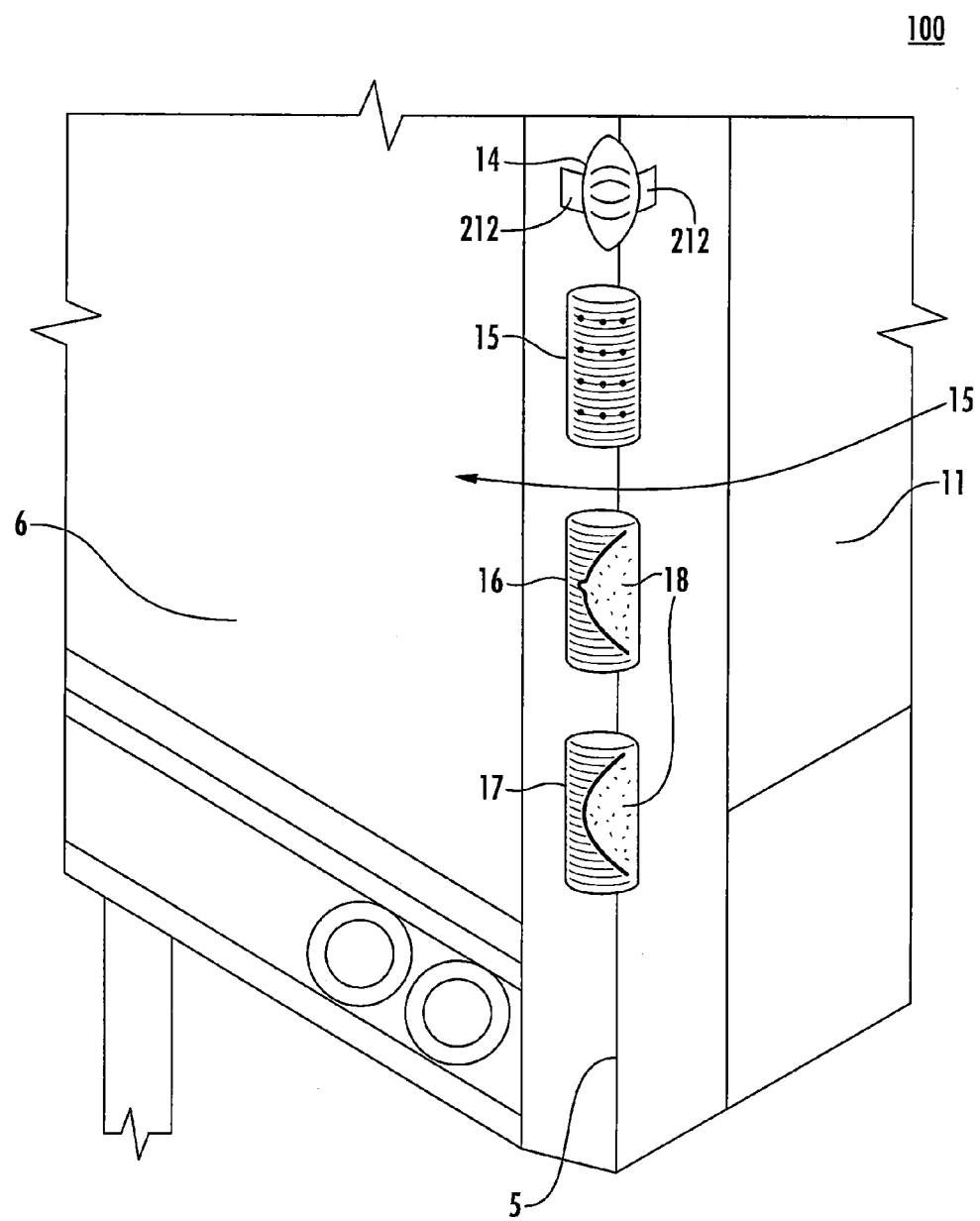
FIG. 6 is a view of the back corner of the trailer including a plurality of vortex structures coupled at the corner, each having different features associated therewith in some embodiments according to the invention.

FIG. 6 is a view of the corner 5 of the trailer 100 including a plurality of vortex structures 14-17 coupled at the corner 5, the structures 14-17 including features such as dimples/indentations, bumps, flow directing fins/protrusions, flow directing channels, differing degrees of surface roughness to alter flow, and flow disrupting fences in some embodiments according to the invention.

According to FIG. 6, the vortex structure 14 is oblong shaped, the vortex structure 15 is cylindrically shaped and includes dimples or indentations and flow directing channels on the curved surface, the vortex structure 16 is cylindrically shaped but include at least one flow directing fin 18 including a pointed trailing edge and flow directing channels on the curved surface. The vortex structure 17 is also cylindrically shaped and includes at least one flow directing fin 18 that is curved and flow directing channels on the curved surface in some embodiments according to the invention.

Figure 7A:
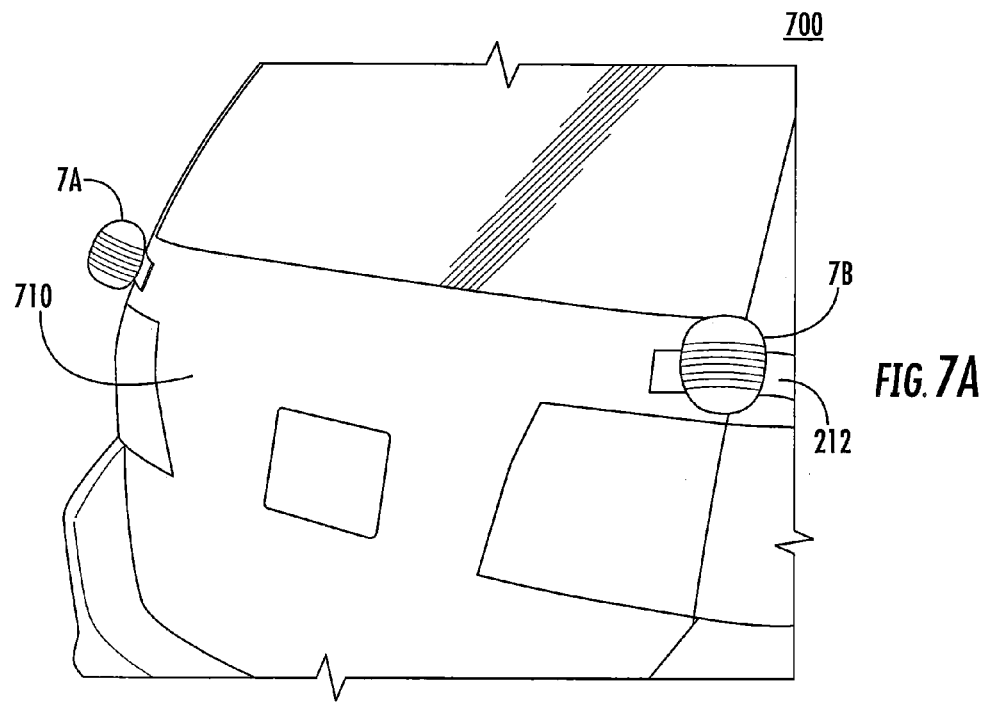
FIGS. 7A and 7B are views of the back of a passenger vehicle including a plurality of vortex structures coupled at opposing rear corners of the vehicle in some embodiments according to the invention.
Figure 7B:
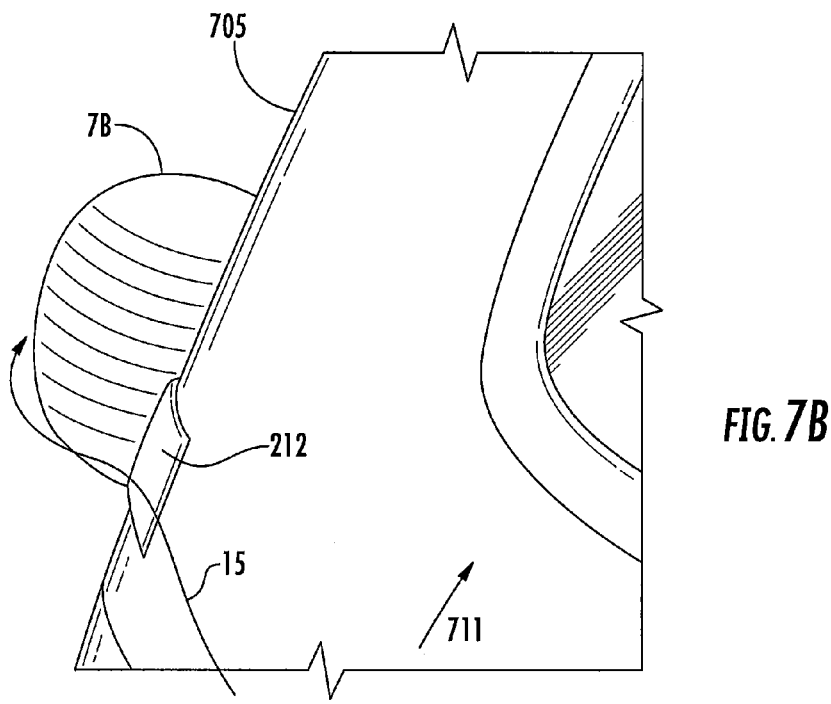

FIGS. 7A and 7B are illustrations of the rear of a passenger vehicle 700 including a vortex structure 7A coupled to the left corner of the vehicle 700 and a vortex structure 7B coupled to the right corner of the vehicle 700. As shown in FIG. 7B, the vortex structure 7B is coupled to the corner 705 where the longitudinal side 711 of the vehicle 700 transitions to the back side 710. In other words, the point where the vortex structure 7B is shown coupled in FIG. 7B is generally identified as the corner where the air flow 15 over the longitudinal side 711 transitions to the back side 710 of the vehicle 700. It will be further understood that the vortex structure 7B protrudes beyond the longitudinal side 711 adjacent to where the vortex structure 7B is coupled, but may actually protrude from other portions of the longitudinal side 711 forward of the corner 705.

Figure 8B:
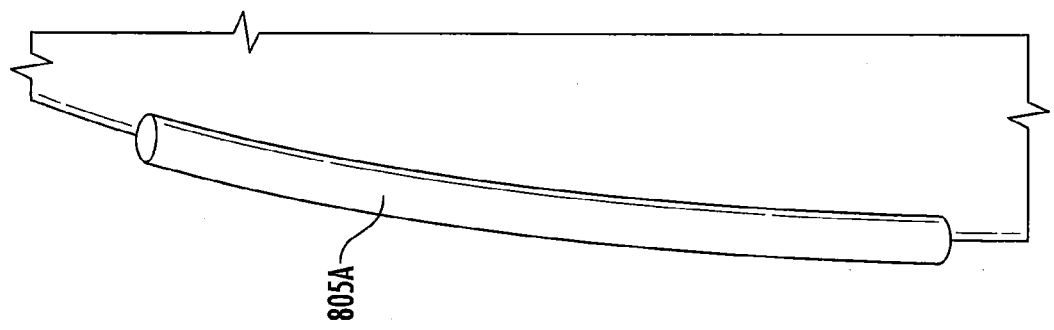
FIGS. 8A and 8B are views of the back of a passenger vehicle including a plurality of elongated cylindrically shaped vortex structures coupled at opposing rear corners of the vehicle in some embodiments according to the invention.
Figure 8A:
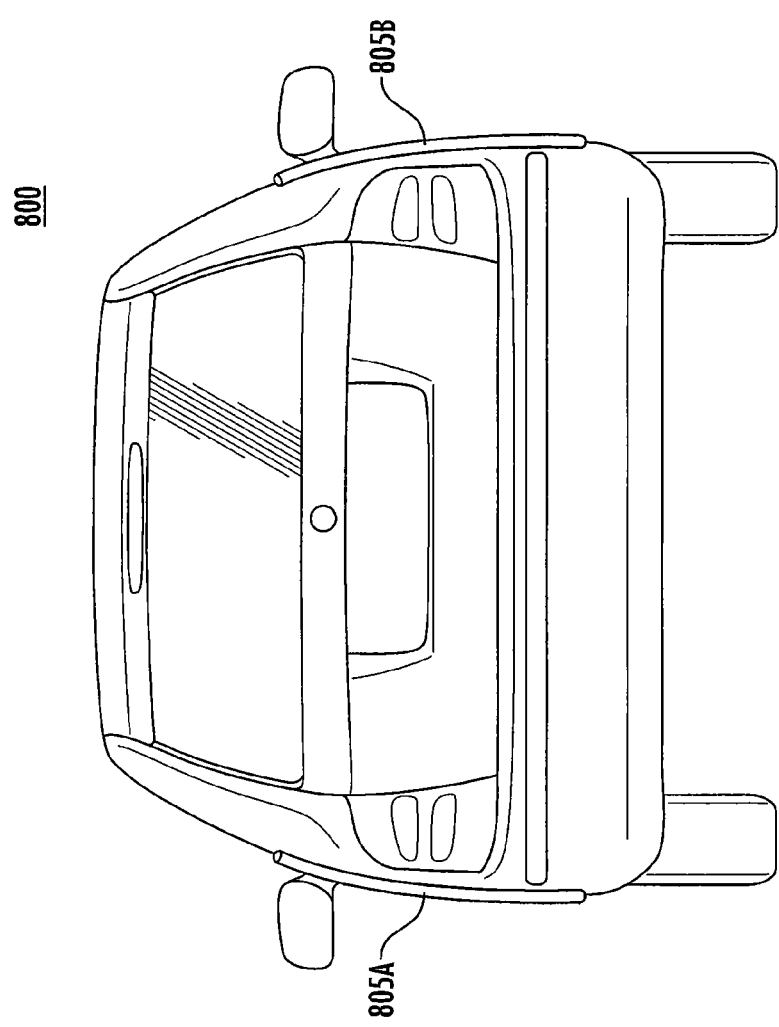

FIGS. 8A and B are a view of the back of a vehicle 800 including a vortex structure 805A on the left side of the vehicle 800 and a vortex structure 805B located on the right side of the vehicle 800. As shown in FIG. 8, the vortex structures 805A and 805B are elongated along the respective corner of the vehicle 800 where the longitudinal side transitions toward the back side of the vehicle 800. Moreover, the elongated vortex structures 805A and 805B protrude into the air flow 15 over the respective longitudinal side by a lesser acouple but provide an overall net reduction in aerodynamic drag provided by the overall cross-sectional area of the respective vortex structure 805A and 805B into the air flow 15 over the respective longitudinal side. In other words, the surface area associated with the vortex structure 805A, 805B is aggregated over the entire length L of the vortex structures 805A and 805B to provide a net reduction in aerodynamic drag in some embodiments according to the invention.

As described herein, in some embodiments according to the invention, a vortex structure can be configured to couple at a corner of a bluff body structure where a longitudinal side of the bluff body transitions toward a back side of the bluff body. The vortex structure can include a curved surface that is configured to protrude beyond the longitudinal side of the bluff body structure into an air flow over the side. For example, when the vortex structure is coupled at the corner, a particular portion of the surface area of the vortex structure can protrude beyond the longitudinal sidewall into an air flow that passes along the longitudinal side. The curved surface is configured to convey the air flow around the corner toward a space that is adjacent to the back side of the bluff body structure. In other words, the curved surface of the vortex structure is curved such that some air flow passing by the longitudinal side is conveyed around the corner to behind the back side thereby reducing aerodynamic drag on the bluff body.

It will be understood that, in some embodiments, the vortex structure can protrude beyond the longitudinal side into the air flow by an amount which is selected to introduce a particular surface area of the vortex structure into the air flow to generate an aerodynamic drag, which can be overcome by the conveyance of the air flow around the corner toward the back side of the bluff body structure. Accordingly, while a certain amount of aerodynamic drag can be introduced by the protrusion of the vortex structure into the air flow, the net effect of the vortex structure is to actually reduce the drag on the bluff body by conveying the air flow around the corner to reduce the vacuum behind the back side by an amount which exceeds the additional drag introduced by the protrusion of the vortex structure into the air flow.

In the drawings and specification, there have been disclosed embodiments according to the invention and, although specific terms are employed, they are used in a generic and descriptive sense only and not for purposes of limitation, the scope of the inventive subject matter being set forth in the following claims.

What is claimed:

1. An apparatus comprising:
a vortex structure configured to couple at a corner where a longitudinal side of a bluff body transitions toward a back side of the bluff body structure; and
a spherical surface of the vortex structure configured to protrude from the longitudinal side of the bluff body structure around the corner to the back side of the bluff body structure when the vortex structure is coupled at the corner, wherein the spherical surface of the vortex structure is configured to convey air flow along the longitudinal side and around the corner to adjacent to the back side of the bluff body structure without any active component of the air flow being generated by the vortex structure.

2. The apparatus of claim 1 further comprising:
a coupling device attached to the vortex structure, the coupling device configured to releasably couple the vortex structure at the corner.

3. The apparatus of claim 2 wherein the coupling device comprises a magnet and/or a hook and loop.

4. The apparatus of claim 2 wherein the coupling device comprises a first coupling device configured to couple to the longitudinal side and a second coupling device configured to couple to the back side.

5. The apparatus of claim 2 wherein the vortex structure comprises a rigid vortex structure.

6. The apparatus of claim 2 wherein the vortex structure comprises a deformable vortex structure configured to deform against the longitudinal side responsive to force applied on the spherical surface toward the longitudinal side.

7. The apparatus of claim 6 wherein the deformable vortex structure comprises an inflatable vortex structure.

8. The apparatus of claim 1 wherein the spherical surface of the vortex structure curves from a point where the spherical surface meets the longitudinal side of the bluff body structure outward from the longitudinal side and toward the back side.

9. The apparatus of claim 1 wherein the spherical surface protrudes beyond the longitudinal side into the air flow to generate an increased aerodynamic drag component to the bluff body structure that is less than a decreased aerodynamic drag component generated by conveying the air flow along the longitudinal side and around the corner to adjacent to the back side of the bluff body structure.

10. The apparatus of claim 9 wherein the spherical surface protrudes beyond the longitudinal side to present about 32 $cm^2$ to about 67 $cm^2$ of surface area into the air flow.

11. The apparatus of claim 1, the vortex structure further comprising:
a notch in the vortex structure configured to conform with the longitudinal side and the corner.

12. The apparatus of claim 11 wherein the notch in the vortex structure includes first and second interior surfaces that meet one another to define an angle that is greater than 90 degrees.

13. The apparatus of claim 12 wherein the first interior surface is configured to interface with the longitudinal side and the second interior surface is configured to interface with the back side.

14. The apparatus of claim 1 wherein the bluff body structure comprises a back facing surface of a passenger automobile.

15. The apparatus of claim 1 further comprising:
at least one fin protruding from the spherical surface of the vortex structure extending in the direction of the air flow along the longitudinal side.

16. The apparatus of claim 1 wherein an entirety of the spherical surface along the air flow is free of an opening that is configured to provide an active drag reduction component for the vortex structure.

17. A truck trailer comprising:
a longitudinal side oriented parallel to air flow over the truck trailer when pulled in a forward direction;
a back side oriented facing opposite the forward direction;
a corner where the longitudinal side transitions toward the back side; and
a vortex structure coupled at the corner, the vortex structure including a spherical surface that protrudes from the longitudinal side of the truck trailer around the corner to the back side, wherein the spherical surface of the vortex structure is configured to convey the air flow along the longitudinal side and around the corner to adjacent to the back side without any active component of the air flow to adjacent to the back side being generated by the vortex structure.

18. The truck trailer of claim 17 wherein the vortex structure comprises a first vortex structure coupled at a first corner, the truck trailer further comprising:
a second vortex structure, separate from the first vortex structure, coupled at the first corner or coupled at a second corner opposite the first corner.

19. The truck trailer of claim 17 wherein the vortex structure is permanently coupled at the corner.

20. The truck trailer of claim 17 further comprising:
at least one coupling device attached to the vortex structure, the at least one coupling device configured to releasably couple the vortex structure at the corner.

21. The truck trailer of claim 20 wherein the at least one coupling device comprises a magnet and/or a hook and loop.

22. The truck trailer of claim 17 wherein the spherical surface protrudes beyond the longitudinal side into the air flow parallel to the longitudinal side to generate an increased aerodynamic drag component to the truck trailer that is less than a decreased aerodynamic drag component generated by conveying the air flow along the longitudinal side and around the corner to adjacent to the back side of the truck trailer.

23. The truck trailer of claim 22 wherein the spherical surface protrudes beyond the longitudinal side to present about 32 $cm^2$ to about 67 $cm^2$ of surface area into the air flow.

24. A vehicle comprising:
a longitudinal side oriented parallel to air flow over the vehicle when moving in a forward direction;
a back side oriented facing opposite the forward direction;
a corner where the longitudinal side transitions toward the back side; and
a vortex structure integrated with the vehicle at the corner, the vortex structure including a spherical surface that protrudes from the longitudinal side of the vehicle around the corner to the back side, wherein the spherical surface of the vortex structure is configured to convey the air flow along the longitudinal side and around the corner to adjacent to the back side without any active component of the air flow to adjacent to the back side being generated by the vortex structure.

\* \* \* \* \*